(12) United States Patent
Edelmann et al.

(10) Patent No.: US 9,389,603 B2
(45) Date of Patent: Jul. 12, 2016

(54) METHOD FOR CONTROLLING AN ELECTRIC MACHINE AND CONTROL DEVICE

(75) Inventors: Thomas Edelmann, Bamberg (DE); Stefan Elsterer, Fürth (DE); Christian Hock, Fürth (DE); Jörn Peschke, Nürnberg (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 596 days.

(21) Appl. No.: 13/805,187

(22) PCT Filed: Jun. 24, 2010

(86) PCT No.: PCT/EP2010/003880
§ 371 (c)(1),
(2), (4) Date: Feb. 5, 2013

(87) PCT Pub. No.: WO2011/160659
PCT Pub. Date: Dec. 29, 2011

(65) Prior Publication Data
US 2013/0144408 A1  Jun. 6, 2013

(51) Int. Cl.
*G05B 19/042* (2006.01)

(52) U.S. Cl.
CPC ........ *G05B 19/0428* (2013.01); *G05B 19/0426* (2013.01); *G05B 2219/23205* (2013.01)

(58) Field of Classification Search
CPC .............................................. G05B 2219/23205
See application file for complete search history.

(56) References Cited

U.S. PATENT DOCUMENTS

| 7,065,413 B2* | 6/2006 | Moebius et al. ................ 700/19 |
| 8,090,672 B2 | 1/2012 | Battenberg |
| 2003/0040814 A1 | 2/2003 | Moebius et al. |
| 2010/0085144 A1 | 4/2010 | Aisa et al. |

FOREIGN PATENT DOCUMENTS

| CN | 1525073 | 9/2004 |
| DE | 19639424 | 3/1997 |
| DE | 10017708 | 10/2001 |
| WO | WO 2006/084666 | 8/2006 |
| WO | WO 2008/090432 | 7/2008 |

* cited by examiner

*Primary Examiner* — Ryan Jarrett
(74) *Attorney, Agent, or Firm* — Cozen O'Connor

(57) ABSTRACT

A method for controlling an electric machine or electric unit by actuating a component of the electric machine or unit using a predicate and by automatically examining the component in regard to the performance of the predicate to permit examination of an automated system for possible errors in a simply manner, wherein the predicate contains an expected value of a (physical) quantity of the component, and wherein in the examination of the component, a check is performed to determine whether the expected value actually arises when the predicate is performed such that erroneous situations can be detected by a runtime system without explicit programming being necessary therefor.

9 Claims, 2 Drawing Sheets

METHOD FOR CONTROLLING AN ELECTRIC MACHINE AND CONTROL DEVICE

CROSS-REFERENCE TO RELATED APPLICATIONS

This is a U.S. national stage of application No. PCT/EP2010/003880 filed 24 Jun. 2010.

BACKGROUND OF THE INVENTION

1. Field of the Invention

The present invention relates to a method for controlling an electric machine or unit by actuating a component of the electric machine or unit using a predicate and by examining the component in regard to the performance of the predicate.

2. Description of the Related Art

In control technology, the predicate is understood to be the functional relationship between several components (generally, subject and object). A drive is switched on using a switch for instance. The switch is the subject here, the drive is the object and the switch-on process is the predicate.

Automation-specific solutions are currently created in most instances by explicit programming of the object to be achieved. The programming of the solution does not, however, constitute the main part of the programming outlay. The tests which are to result in them reacting accordingly in the event of an error and if necessary generating a corresponding error message are even more complicated than the actual solution.

WO 2006/084666 A1 describes a system for checking and evaluating operation-dependent processes and/or components, which includes a robot, which records measured values using at least one sensor on an operating and/or control element of the components to be checked or evaluated. In a central evaluation unit, the measured values are analyzed and evaluated with the aid of defined quality functions.

DE 100 17 708 A1 describes a method for controlling mechanisms or technical systems in which the mechanisms or technical systems to be controlled are stored in a controller, in terms of their elementary functions, with their states defined according to command and the associated signal images of the sensors and actuators. Based on a defined reference state at the start of the control activation, a continuous comparison of the actual states notified by the technical unit by the sensors occurs with the target state stored in the controller for all elementary functions.

WO 2008/090432 A1 discloses an electric device, i.e., a household appliance. For self-diagnosis of the household appliance, the electrical quantities of the components are fed to a control facility when the electrical components are switched on, where the control facility compares these quantities that are stored in a storage facility.

System states and error possibilities have previously been examined explicitly and therefore form part of the automation-specific programming. However, this is disadvantageous in that, on the one hand, the possibility of an error must be identified as such. This service must be provided by the programmer. On the other hand, it is complicated to test these program parts, because the error state has to be simulated or produced to do so.

SUMMARY OF THE INVENTION

It is therefore an object of the present invention to provide a method for identifying errors in automation solutions with less effort.

This and other objects and advantages are achieved in accordance with the invention by a method for controlling an electric machine or electric unit by actuating a component of the electric machine or electric unit using a predicate in which a functional relationship is defined between a subject and the component, where the predicate contains an expected value of a quantity of the component, and by automatically examining the component in regard to the performance of the predicate and where in the examination of the component, a check is performed to determine whether the expected value actually occurs when the predicate is performed, where the component includes a self-description, which contains run-time information that is used in the examination as reference for the quantity, and where a control signal for the electric machine or electric unit is obtained from the difference between the reference for the quantity and the value to be expected.

It is also an object of the invention to provide a control device for an electric machine or electric unit having an actuating facility for actuating a component of the electric machine or electric unit using a predicate in which a functional relationship is defined between a subject and the component, where the predicate contains a value to be expected of a quantity of the component and an examination facility for automatically examining the component in regard to the performance of a predicate, where the examination facility can check whether the expected value actually occurs when the predicate is performed, where the component in a run-time system includes a self-description, which contains run-time information, and where the run-time system is configured to obtain a control signal for the electric machine or electric unit from a difference between the reference for the quantity and the value to be expected.

The term "quantity" is understood here to mean, for instance, a physical or calculated quantity. Its value can be absolute or relative, but may also be non-specific (e.g., increase).

The predicate, in other words the function, which has to be performed, is advantageously combined with an expectation (i.e., a value to be expected). This therefore already implicitly specifies which consequences the performance of the predicate has. If these consequences do not arise, an error appears in the system and it can respond accordingly. Conversely, if the consequences arise, the system operates in an error-free manner.

In the examination, the (physical) quantity of the component is preferably measured, and the resulting measured value is correspondingly examined to determine whether it falls within an estimated range, which is based on the value to be expected and which can be stored as run-time information relating to the component. An actual measurement is therefore implemented, and the obtained measured value is compared with the value to be expected from the predicate or a value that results from the value to be expected, such as by the offset. The comparison result can be used for control or information purposes.

In a specific embodiment, the value to be expected may be a relative value. The predicate is therefore not restricted thereto, such that only absolute "expected values" can be transmitted therewith, but instead relative values, such as an increase or decrease, can be linked to the predicate. A specific increase would be "+3 A", for instance, a non-specific increase would be "increase".

Furthermore, an error message can automatically be generated if the expected value does not actually arise when the predicate is performed. This is advantageous insofar as some errors can be immediately displayed to draw conclusions as quickly as possible.

In a specific exemplary embodiment, the component may be a drive. The component may, however, also be any other unit in an automated system, e.g. bulb, relay or any other actuator.

Furthermore, run-time information can be specified for the component, which is used as a reference for the (physical) quantity in the examination. This run-time information is a physical quantity, such as the speed or the power consumption, such during the run time of the electric machine or unit. If this run-time information is stored in a control program pertaining to the component, the system can be examined using the control program.

The predicate may mean that the component is switched on or off. It may, however, also mean another function, e.g., "implementing a step" in a stepper motor or another function of an automated system.

Furthermore, the (physical) quantity, for which an expected value is contained in the predicate, may be the current, the voltage or the speed. This may essentially be a (physical) quantity or also any other quantity which can be measured for examination on the component (e.g., frequency, brightness or $CO_2$ discharge).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is now explained in more detail with the aid of the appended drawing, in which.

DETAILED DESCRIPTION OF THE PREFERRED EMBODIMENTS

The exemplary embodiments shown in more detail below represent preferred embodiments of the present invention.

The programming of an automation-specific unit by functional modeling and the semantic description of the functional relationships inventively offers new possibilities of automatically detecting error situations. The basic idea consists in expanding the description of functional relationships by non-functional aspects. The additional information that relates to these non-functional aspects is used at generation time (e.g., in the engineering system) and at run time (in a run-time system), in order to automatically address obligatory boundary conditions and error situations.

The automatic examination relieves the application creator (project engineer) of routine tasks. Furthermore, a frequent source of error in unit development is minimized, because in an average unit development according to the current standard, an application creator typically spends 30% of his/her development time in creating component tests or similar tasks for treating errors. Attempts are therefore made to identify error situations by the run-time system, without explicit programming being required therefor. Furthermore, automatic generation of human-readable error messages would also be advantageous.

Figure 1:
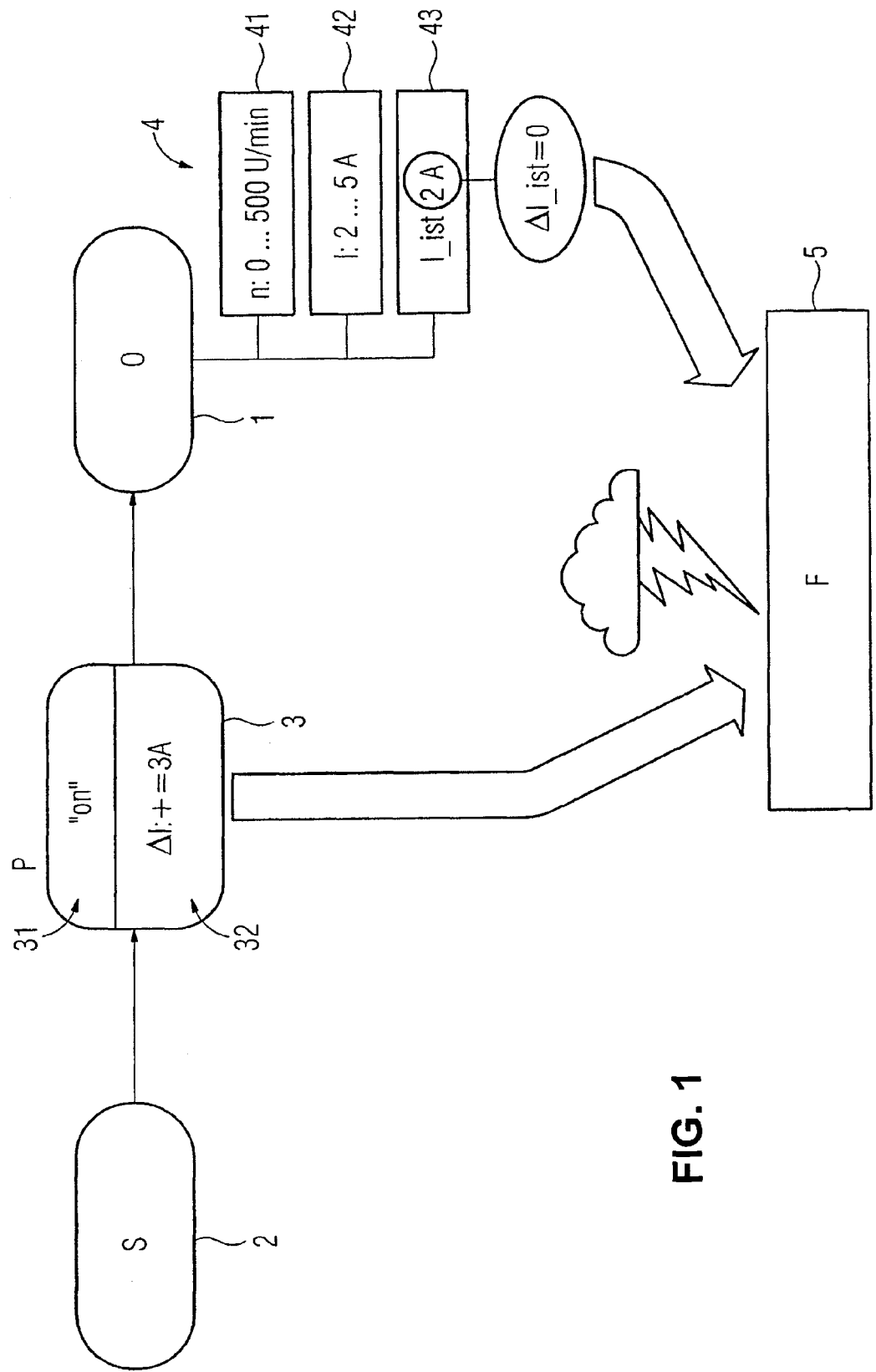
FIG. 1 shows a schematic block diagram of the method or the control device in accordance with the invention.

A particular embodiment is shown in more detail below in the example of FIG. 1. The controller of an individual component 1, which represents the object, is considered here by way of example from an overall system. The object or the component 1 is a drive for instance. The drive is actuated by a switch that represents the subject 2. The functional relationship between the subject 2 and the object or the component 1 is defined in the predicate 3. Here, the predicate 3 represents the function "switch on". The predicate 3 links subject 2 and object (component) 1 by means of the corresponding function. In the present example, the functional relationship reads: "The drive is switched on by a switch". Each relationship between the components of an automated system can in general be represented by a similar functional link.

The components in a run-time system (e.g., sensors, drives or subsystems) have a strictly typed functional interface. This means that a component can only be actuated with rigidly predetermined commands (e.g., switch-on, switch-off). The components 1 in the run-time system can also have a self-description 4. These may be typed, product-describing properties, such as data for a drive. Such data 41, 42 would be, for instance, the current consumption I=2 . . . 5 A and the speed n=0 . . . 500 rpm. Furthermore, the self-description 4 of a component 1 may also contain typed run-time information 43. In the present example, the run-time information 43 reads for instance: current consumption I_ist=2 A. This run-time information is measured as current information and stored in the corresponding data field.

In the example, the figure, in other words the drive, should be switched on by the switch according to the predicate 3 ("on"). The components (the subject 2 is likewise a component) are connected by functional relationships (predicates). In addition to the main function 31 (here "on"=switch on), the predicates also have a semantic description 32 relating to the possible effects of the predicate 3 on the components 1, 2. In the present example, the current consumption and the speed should increase by the predicate "on" (switch on). The semantic description 32 indicates here that an increase in current by 3 A is expected when the drive is switched on. The semantic information exists in a manner so as to be interpreted by machines.

The connection of components 1, 2 by predicates 3 within the scope of programming implicitly connects information that uses the run-time system to implement integration tests (tests prior to commissioning) or tests during operation. In the present example, in accordance with predicate 3, it is expected that the drive 1 has a current consumption increased by 3A after switch-on. The property 42 stored in respect of drive 1 indicates that the current consumption of the drive 1 has to lie between 2 and 4A. When idling, the electric drive therefore has a current consumption of 2A by means of the control electronics and a current consumption of 5A with a maximum output. The run time such that the current consumption is I_ist=2A is now provided to the drive 1. This means that despite the drive being switched on, there has been no increase in the current consumption. It remains instead at 2A. This in turn means that the actual current consumption does not correspond to the expected current consumption because the expected value for the current consumption would be 2A (basic current)+3A (relative increase)=5A.

The run-time system may, however, also be geared to the change in the current consumption in the actual instance. In the present case, the relative change actually amounts to 0

($\Delta$I_ist=0), while the expected change in current consumption amounts to $\Delta I=3A$. The run-time system determines this difference and generates a corresponding error message 5. Alternatively, a control signal can also be obtained from this information for the system, i.e., the unit and/or electric machine. The error message and/or information can therefore be generated based on the semantic description and typed component properties. One example of a human-readable error message would be "error during switch-on" or "too little current during switch-on".

In accordance with the disclosed embodiments of the invention, error situations can therefore be identified by the run-time system without programming being explicitly required therefor. Logic for error detection is therefore contained in the system.

Figure 2:
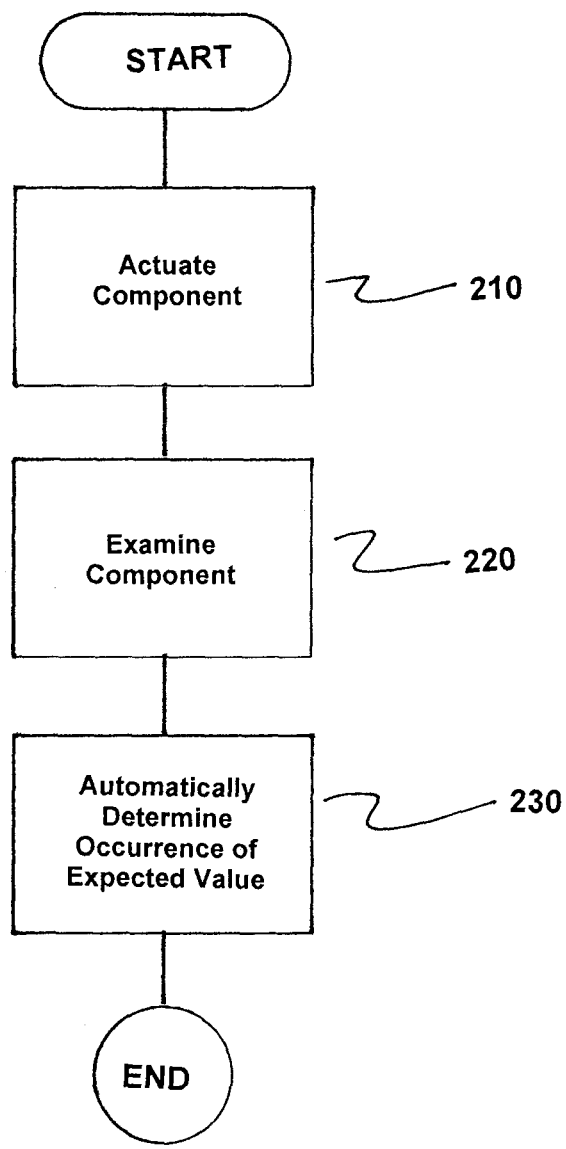
FIG. 2 is a flowchart of the method in accordance with the invention.

FIG. 2 is a flowchart of a method for controlling an electric machine or electric unit. The method comprises actuating a component of the electric machine or electric unit using a predicate in which a functional relationship is defined between a subject and the component, as indicated in step 210. Here, the predicate including an expected value of a quantity of the component. Next, the component is automatically examined to determine a performance of the predicate, as indicated in step 220. During examination of the component a check is then performed to determine whether the expected value occurs when the predicate is performed, as indicated in step 230.

According to the invention, the component includes a self-description including run-time information that is used as a reference for a quantity during the examination, a control signal for the electric machine or electric unit is obtained from a difference between the reference for the quantity and the expected value.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling an electric machine or electric unit, comprising the steps of:
    actuating a component of the electric machine or electric unit using a predicate in which a functional relationship is defined between a subject and the component, the predicate including an expected numerical value of a numerical quantity of the component;
    automatically examining the component to determine a performance of the predicate; and
    checking during examination of the component to determine whether the expected numerical value is within an estimated range when the predicate is performed, the estimated range being based on the expected numerical value and being stored as run-time information relating to the component;
    wherein the component includes a self-description including run-time information which is used as a reference for the numerical quantity during the examination; and
    wherein a control signal for the electric machine or electric unit is obtained from a difference between the reference for the numerical quantity and the expected numerical value.

2. The method as claimed in claim 1, wherein in the examination, the quantity of the component is measured and the resulting measured value is accordingly checked to determine whether it falls within an estimated range which is based on the expected numerical value.

3. The method as claimed in claim 2, wherein the expected numerical value is a relative value.

4. The method as claimed in claim 1, wherein the expected numerical value is a relative value.

5. The method as claimed in claim 1, further comprising the step of:
    generating an error message automatically if the expected numerical value does not occur when the predicate is performed.

6. The method as claimed in claim 1, wherein the component is a drive.

7. The method as claimed in claim 1, wherein the predicate indicates a switching on or switching off of the component.

8. The method as claimed in claim 1, wherein the numerical quantity is one of a current, a voltage or a speed.

9. A control device for an electric machine or electronic unit, comprising:
    an actuation device for actuating a component of the electric machine or electric unit using a predicate in which a functional relationship is defined between a subject and the component, the predicate including an expected numerical value of a numerical quantity of the component, and
    an examination facility configured to automatically examine a performance of the component and configured to check whether the expected numerical value is within an estimated range when the predicate is performed, the estimated range being based on the expected numerical value and being stored as run-time information relating to the component;
    wherein the component in a run-time system includes a self-description containing run-time information; and
    wherein the run-time system is configured to obtain a control signal for the electric machine or electric unit from a difference between the reference for the numerical quantity and the expected numerical value.

* * * * *